United States Patent

Miyabayashi

[11] Patent Number: 6,028,148
[45] Date of Patent: *Feb. 22, 2000

[54] SILICONE RUBBER COMPOSITION, MOLDING PRODUCT FORMED FROM THE COMPOSITION, ELASTIC REVOLUTION BODY HAVING THE COMPOSITION AND FIXING DEVICE

[75] Inventor: Toshiyuki Miyabayashi, Tokyo, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/112,231

[22] Filed: Aug. 27, 1993

Related U.S. Application Data

[63] Continuation of application No. 07/581,782, Sep. 13, 1990, abandoned.

[30] Foreign Application Priority Data

Sep. 14, 1989 [JP] Japan ................................ 1-238952

[51] Int. Cl.[7] ...................................................... B41N 7/00
[52] U.S. Cl. ........................... 525/478; 428/372; 428/379; 428/375; 428/383; 428/447; 492/56; 525/479
[58] Field of Search ...................................... 428/447, 391, 428/375, 379, 383, 372; 525/478, 479; 492/56

[56] References Cited

U.S. PATENT DOCUMENTS 4,500,659  2/1985  Kroupa et al. .......................... 523/212
4,777,087  10/1988  Heeks et al. .......................... 428/321.1

FOREIGN PATENT DOCUMENTS 18140  10/1980  European Pat. Off. .
322099  6/1989  European Pat. Off. .
60-16975  8/1985  Japan .

*Primary Examiner*—Newton Edwards
*Assistant Examiner*—J. M. Gray
*Attorney, Agent, or Firm*—Fitzpatrick, Cella, Harper & Scinto

[57] ABSTRACT

A silicone rubber composition comprises a silicone rubber and porous inorganic fine powders holding dimethylsilicone oil.

12 Claims, 3 Drawing Sheets

SILICONE RUBBER COMPOSITION, MOLDING PRODUCT FORMED FROM THE COMPOSITION, ELASTIC REVOLUTION BODY HAVING THE COMPOSITION AND FIXING DEVICE

This application is a continuation of application Ser. No. 07/581,782 filed Sep. 13, 1990, now abandoned.

BACKGROUND OF THE INVENTION

1. Field of the Invention

This invention relates to a silicone rubber composition, a molding product formed from the composition, an elastic revolution body provided with an elastic member having a surface layer formed from the composition and a fixing device having the elastic revolution body.

2. Related Background Art

In an image-forming apparatus such as an electrophotographic copying machine, carryability, releasability and durability are generally required for a carrier roller which carries a sheet-form transfer material or a recording material such as plain paper along the predetermined route.

Particularly, a fixing device provided with a fixing roller or a press roller which carries the transfer material to the predetermined route while giving heat to the unfixed toner images on the transfer material under pressing and preventing the offset phenomena of the toner in a semi-molten or molten state, requires strict carryability, releasability, wear resistance, fixability and durability. The fixing device of this type has at least a heating means such as a fixing roller and a rotating press roller in contact with the heating means under pressing.

The heating means such as a fixing roller comprises a hollow core cylinder made from such a material as aluminum or iron, and a layer coated on the surface of the hollow core cylinder, the layer being composed of a material having a good releasability such as fluorocarbon resin, for example, polytetrafluoroethylene (PTEF) or tetrafluoroethylene-fluoroalkoxyethylene copolymer (PFA) or silicone rubber.

At the inside of the fixing roller, a heater such as a halogen lamp is provided, when required, to heat the surface of the fixing roller to a specific temperature suitable for the fixation. In many cases, the surface temperature of the fixing roller is continuously controlled to keep a set temperature by a sensor.

At the outer peripheral surface of the fixing roller, a cleaning means for removing the attached toner or paper dusts, or a separation means such as a separation nail for preventing a toner image-carrying material such as a transfer material from coiling around the fixing roller is sometimes provided.

On the other hand, the press roller comprises a core cylinder made from such a material as iron or stainless steel, and an elastic member having a good releasability coated on the surface of the core cylinder, the elastic member being composed of silicone rubber. The press roller presses the heating means such as a fixing roller by a pressing means such as a spring.

The toner image-carrying material having an unfixed toner image on the surface is carried by the heating means such as the fixing roller and the press roller with heating under pressing, as pinched therebetween, thereby, heat-fixing under pressing the unfixed toner image on the surface.

When a positively charged toner is to be fixed in a fixing device, problems in image quality have often been encountered such as offset phenomena of toner and line blurring of toner image, and as to the toner attachment to the surface of the press roller. Particularly in a fixing device without a cleaning means for cleaning the surface of the fixing roller, these problems have been encountered more often.

SUMMARY OF THE INVENTION

An object of the present invention is to provide a silicone rubber composition, a molding product, an elastic revolution body and a fixing device, which are free from the foregoing problems.

Another object of the present invention is to provide a silicone rubber composition capable of containing dimethylsilicone oil at a high concentration, a molding product and an elastic revolution body.

Another object of the present invention is to provide a silicone rubber composition capable of forming a molding product having good dimensional stability and releasability.

Further object of the present invention is to provide a molding product of silicone rubber having good electrical insulating property and mechanical strength.

A still further object of the present invention is to provide an elastic revolution body capable of efficiently maintaining a minus potential.

A still further object of the present invention is to provide an elastic revolution body of slow dimethylsilicone oil release.

A still further object of the present invention is to provide an elastic revolution body having good releasability, wear resistance and durability.

A still further object of the present invention is to provide a fixing device for fixing a positively charged toner.

A still further object of the present invention is to provide a fixing device with good durability and offset resistance.

A still further object of the present invention is to provide a silicone rubber composition comprising a silicone rubber and porous inorganic fine powders holding dimethylsilicone oil.

A still further object of the present invention is to provide a molding product comprising a solid silicone rubber and porous inorganic fine powders holding dimethylsilicone oil contained in the solid silicone rubber.

A still further object of the present invention is to provide an elastic revolution body comprising an elastic layer formed from a silicone rubber composition comprising a silicone rubber and porous inorganic fine powders holding dimethylsilicone oil.

A still further object of the present invention is to provide a fixing device for fixing an unfixed toner image on a toner image-carrying material with heating and pressing by carrying the toner image-carrying material at least between a heating means and a roller, as pinched therebetween, which comprises a roller having an elastic layer as a surface layer, the elastic layer being formed from a silicone rubber composition comprising a silicone rubber and porous inorganic fine powders holding dimethylsilicone oil.

DETAILED DESCRIPTION OF THE PREFERRED EMBODIMENTS

Figure 1:
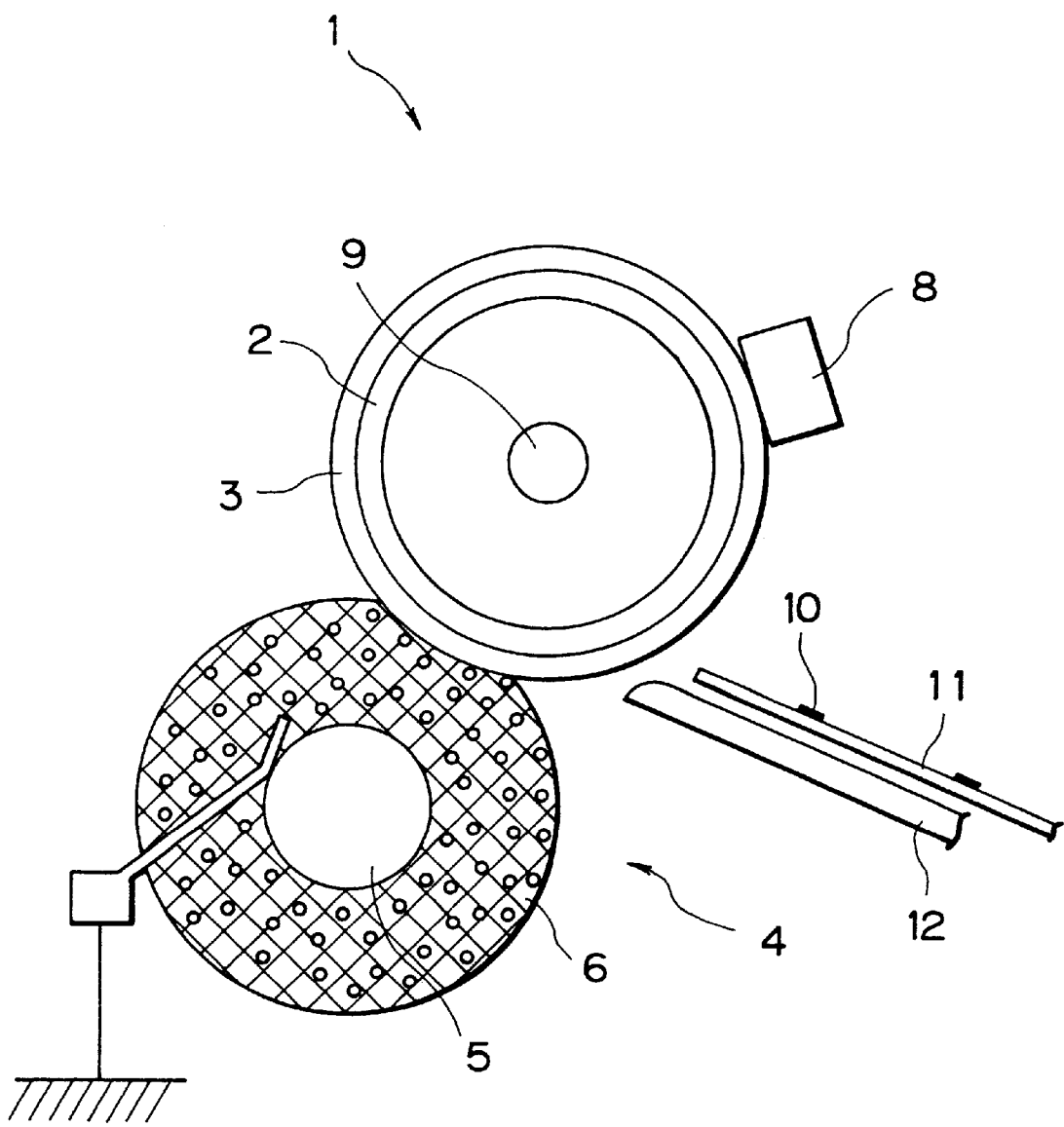
FIG. 1 is a vertical cross-sectional view showing one embodiment of a fixing device according to the present invention.

According to the present invention, a large amount of dimethylsilicone oil can be contained in a molding product formed from a silicone rubber composition by adding porous inorganic fine powders having micropores containing dimethylsilicone oil to the silicone rubber composition and the electrical insulation of the molding product formed from the silicone rubber composition can be improved thereby.

The present silicone rubber composition may be any type of the following compositions: of condensation reaction type, addition reaction type and radical reaction type. The polymer component constituting the present silicone rubber composition has the following structural unit in the main chain skeleton:

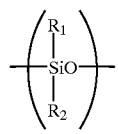

wherein $R_1$ and $R_2$ are the same or different groups and represent alkyl such as methyl and ethyl; aryl such as phenyl; and polyfluoroalkyl such as trifluoropropyl.

Examples of silicone rubber of condensation type include silicone rubber of dealcoholization type, silicone rubber of deoximization type, silicone rubber of deacetylization type, silicone rubber of dehydrogenation type, etc.

Silicone rubber of addition reaction type can be prepared, for example, by mixing a first liquid containing at least a liquid vinyl-containing diorganopolysiloxane.

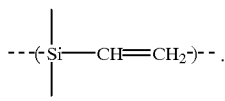

as a base polymer and a platinum catalyst as a curing reaction catalyst with a second liquid containing at least an active hydrogen radical-containing siloxane as a cross-linking agent (working

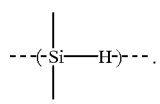

as a curing agent) and a liquid vinyl-containing diorganopolysiloxane in a predetermined ratio (for example, a ratio of 1:1), defoaming and then heating the mixture, thereby curing the mixture. The thus obtained silicone rubber of addition reaction type has a cross-linked structure and thus is in a solid state and has elasticity.

For example, the silicone rubber of addition reaction type can be prepared by reacting a vinyl-containing organopolysiloxane containing a vinyl group as an unsaturated group, represented by the following formula:

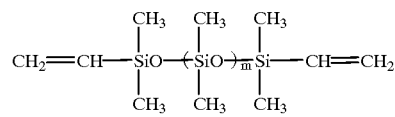

wherein m is a positive integer, or a vinyl-containing organopolysiloxane having a group represented by the following formula:

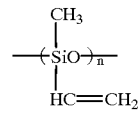

wherein n is a positive integer, with an active hydrogen radical-containing siloxane having a group represented by the lowing formula:

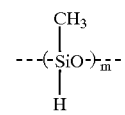

wherein m is a positive interger, in the presence of a platinum-based catalyst at a reaction temperature of 60° C. to 170° C.

Silicone rubber of radical reaction type is a so-called heat vulcanization type, silicone rubber. For example, unvulcanized silicone rubber having the following structural unit:

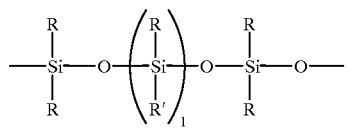

wherein R is methyl: R' is vinyl, phenyl or fluoroalkyl; and l is a positive integer, is kneaded with an organic peroxide as a vulcanizing agent and then the mixture is heated, thereby vulcanizing the mixture. As a result, an elastic vulcanized silicone rubber can be formed.

In the present invention, dimethylsilicone oil is a well known one represented by the following general formula:

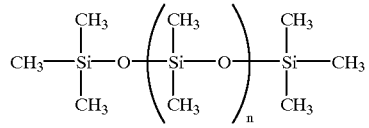

wherein n is a positive integer.

Dimethylsilicone oil having a viscosity at 25° C. of 10 to 100,000 cs, preferably 100 to 60,000 cs, is preferable from the viewpoints of impregnation efficiency to the porous inorganic fine powders and slow release of the dimethylsilicone oil from the molding product.

As the porous fine powders having micropores for use in the present invention, inorganic fine powders are preferable from the viewpoint of heat stability, and porous inorganic fine powders having a high oil absorbability capable of holding a large amount of dimethylsilicone oil for use in the present invention are preferable. Examples of such porous inorganic fine powders may include: Gyrolite-type calcium silicate (e.g. FLORITE, trade name of a product made by Tokuyama Soda K.K.); Spherical porous silica (e.g. M.S. GEL, trade name of a product made by Dokai Kagaku Kogyo K.K.; SILICA MICROBEADS, trade name of a product made by Shokubai Kasei Kogyo K.K.; and SYLOID, trade name of a product made by Fuji-Davison K.K.) and Sirasu-balloon (special powder obtained from volcanic ash).

Suitable porous inorganic fine powders have a particle size ranging from 1 to 70 $\mu$m, an average particle size ranging from 1 to 40 $\mu$m and an oil absorbability of 200 to 800 ml/100 g, preferably 300 to 600 ml/100 g. The oil absorbability of the porous inorganic fine powders is determined according to JIS K5101 procedure.

Impregnation ratio of the dimethylsilicone oil to the porous inorganic fine powders is preferably 100 to 600 parts by weight of the oil to 100 parts by weight of the powder, more preferably 200–500 parts by weight of the oil to 100 parts by weight of the powder.

An amount of the porous inorganic fine powders with micropores holding the dimethylsilicone oil to be added to the silicone rubber composition is 0.1 to 30% by weight, preferably 1 to 20% by weight in terms of net content of dimethylsilicone oil on the basis of the silicone rubber. Below 0.1% by weight, no remarkable increase in the electrical insulation is expectable, whereas above 30% by weight the physical properties of molding product of silicone rubber are lowered.

The present silicone rubber composition may contain a filler such as fine synthetic silica powders, quartz powders, molten quartz powders, diatomaceous earth, calcium carbonate, etc. Furthermore, the present silicone rubber composition may contain a heat resistance-improving agent such as iron oxide, i.e. red iron oxide; a compression set-improving agent such as titanium oxide and zinc oxide; and a dispersing agent such as a low molecular weight siloxane.

The present molding product of silicone rubber includes, for example, products in a sheet form and a roller form.

The present elastic revolution body comprises an elastic member formed from the present silicone rubber composition containing porous inorganic fine powders with micropores holding dimethylsilicone oil.

The present fixing device has a function to fix an infixed toner image formed on a toner image-carrying material with heating under pressing by passing the toner image-carrying material at least between a heating means and a roller, and pinched therebetween. The present fixing device is suitable for fixation of positively charged toner.

Embodiments of the present elastic revolution body and the present fixing device will be described in detail below, referring to the accompanying drawings.

FIG. 1 is a vertical cross-sectional view of the structure of a fixing device provided with the present elastic revolution body as a press roller.

In FIG. 1, a fixing roller 1 comprises a core cylinder 2 made from such a material as aluminum, iron or stainless steel and a layer 3 of resin having a good heat resistance and a good releasability such as polytetrafluoroethylene (PTFE), and tetrafluoroethylene-fluoroalkoxyethylene copolymer (PFA), formed on the outer surface of the core cylinder 2. At the inside of the core cylinder 2, a heating means 9 such as a heater is provided.

A press roller 4 is pressed onto the fixing roller 1 by a pressing means such as a spring (not shown in the drawing), causing the press roller to undergo follower revolution corresponding to the revolution of the fixing roller 1. The press roller 4 comprises a core cylinder 5 formed from such a material as iron or stainless steel and a layer 6 of elastomer formed from the present silicone rubber composition, laid on the surface of the core cylinder 5.

A thermometer 8 for detecting the surface temperature of the fixing roller 1 and a cleaner for cleaning the surface of the fixing roller 1 through contact with the fixing roller 1 may be provided at positions near the outer peripheral surface of the fixing roller 1. Furthermore, an inlet guide 12 for leading a toner image-carrying material 11 such as a transfer material, for example, plain paper having a toner image 10 between the fixing roller 1 and the press roller 4 may also be provided at a position near the fixing roller 1.

The present invention will be described in detail below, referring to Examples, where parts are by weight.

EXAMPLE 1

Porous fine inorganic powders holding dimethyl-silicone oil were prepared as follows:

100 parts of gyrolite-type calcium silicate (FLORITE R, trade name of a product made by Tokuyama Soda K.K.) having an average particle size of 25 $\mu$m, micropore size of about 0.01 to about 10 $\mu$m, an oil absorbability of 500 ml/100 g, an apparent specific gravity of 0.1, and a BET specific surface area of 115 m$^2$/g was charged into a vessel with a stirrer, and then the vessel was heated to 150° C. Then, 400 parts of dimethylsilicone oil (KF96H, trade name of a product made by Shinetsu Kagaku Kogyo K.K.) having a viscosity of 10,000 cs (25° C.) heated likewise to 150° C. were slowly dropwise added to the fine calcium silicate powders while stirring state. After the addition of the total amount (400 parts) of the oil, the stirring was continued for some period of time, and then the mixture was taken out of the vessel, whereby fine calcium silicate powders holding the dimethylsilicone oil having a viscosity of 10,000 cs were obtained. 100 parts of vinyl-containing diorganopolysiloxane, 5 parts of dry fine silica powders, 20 parts of quartz powders, 1 part of red iron oxide and a catalytic amount of a platinum-based catalyst were mixed to prepare a liquid silicone rubber composition of addition reaction type having a viscosity of 900 poises. To 100 parts of the thus prepared liquid silicone rubber composition of addition reaction type, 10 parts of the porous inorganic fine powders were added with micropores holding the dimethylsilicone oil (KF96H, trade name of a product made by Shinetsu Kagaku Kogyo K.K.) having a viscosity of 10,000 cs as obtained above, followed by uniform stirring and dispersion. The resulting liquid silicone rubber composition of addition reaction type was designated as liquid A.

On the other hand, 100 parts of a mixture of vinyl-containing diorganopolysiloxane and an active hydrogen radical-containing diorganopolysiloxane, 5 parts of dry fine silica powders, 20 parts of quartz powders and 1 part of red iron oxide, were mixed to prepare a liquid silicone rubber composition of addition reaction type having a viscosity of 600 poises. To 100 parts of the thus prepared liquid silicone rubber composition, 10 parts of the same porous inorganic fine powders were added with the micropores holding the dimethylsilicone oil as used for the preparation of liquid A, followed by uniform stirring and dispersion. The resulting liquid silicone rubber composition of addition reaction type was designated as liquid B.

Then, liquids A and B were mixed together in a ratio of 100:100 by weight, and the mixture was subjected to defoamation and then heated at 150° C. for 10 minutes, whereby addition reaction of the vinyl group and the silicon-bonded active hydrogen radical in the mixed compositions started in the presence of a platinum catalyst to cure the mixed composition, thereby forming rubbery elastomer.

COMPARATIVE EXAMPLE 1

A liquid silicone rubber composition of addition reaction type having a viscosity of 900 poises was prepared as liquid C in the same manner as that for the preparation of liquid A in Example 1, except that no such inorganic fine powders holding the dimethylsilicone oil having a viscosity of 10,000 cs as used in Example 1, were used at all.

Furthermore, a liquid silicone rubber composition of addition reaction type having a viscosity of 600 poises was prepared as liquid D in the same manner as that for the preparation of liquid B in Example 1, except that no such inorganic fine powders holding the dimethylsilicone oil having a viscosity of 10,000 cs as used in Example 1, were used at all.

Then, liquids C and D were mixed together in a ratio of 100:100 by weight, and the mixture was subjected to defoamation and then heated at 150° C. for 10 minutes, whereby addition reaction of the vinyl group and the silicon-bonded active hydrogen radical in the mixed compositions started in the presence of a platinum catalyst to cure the mixed composition, thereby forming rubbery elastomer.

COMPARATIVE EXAMPLE 2

A liquid silicone rubber composition of addition reaction type was prepared as liquid E in the same manner as that for the preparation of liquid A in Example 1, except that 10 parts of dimethylsilicone oil (KF96H, trade name of a product made by Shinetsu Kagaku Kogyo K.K.) having a viscosity of 10,000 cs itself was used in place of the inorganic fine powders holding the dimethylsilicone oil having a viscosity of 10,000 cs.

A liquid silicone rubber composition of addition reaction type was prepared as liquid F in the same manner as that for the preparation of liquid B in Example 1, except that 10 parts of dimethylsilicone oil (KF96H, trade name of a product made by Shinetsu Kagaku Kogyo K.K.) having a viscosity of 10,000 cs itself was used in place of the inorganic fine powders holding the dimethylsilicone oil having a viscosity of 10,000 Cs.

Then, liquids E and F were mixed together in a ratio of 100:100 by weight, and the mixture was subjected to defoamation and then heated at 150° C. for 10 minutes, whereby addition reaction of the vinyl group and the silicon-bonded active hydrogen radical in the mixed compositions started in the presence of a platinum catalyst to cure the mixed composition, thereby forming rubbery elastomer.

TEST EXAMPLE 1

Figure 2:
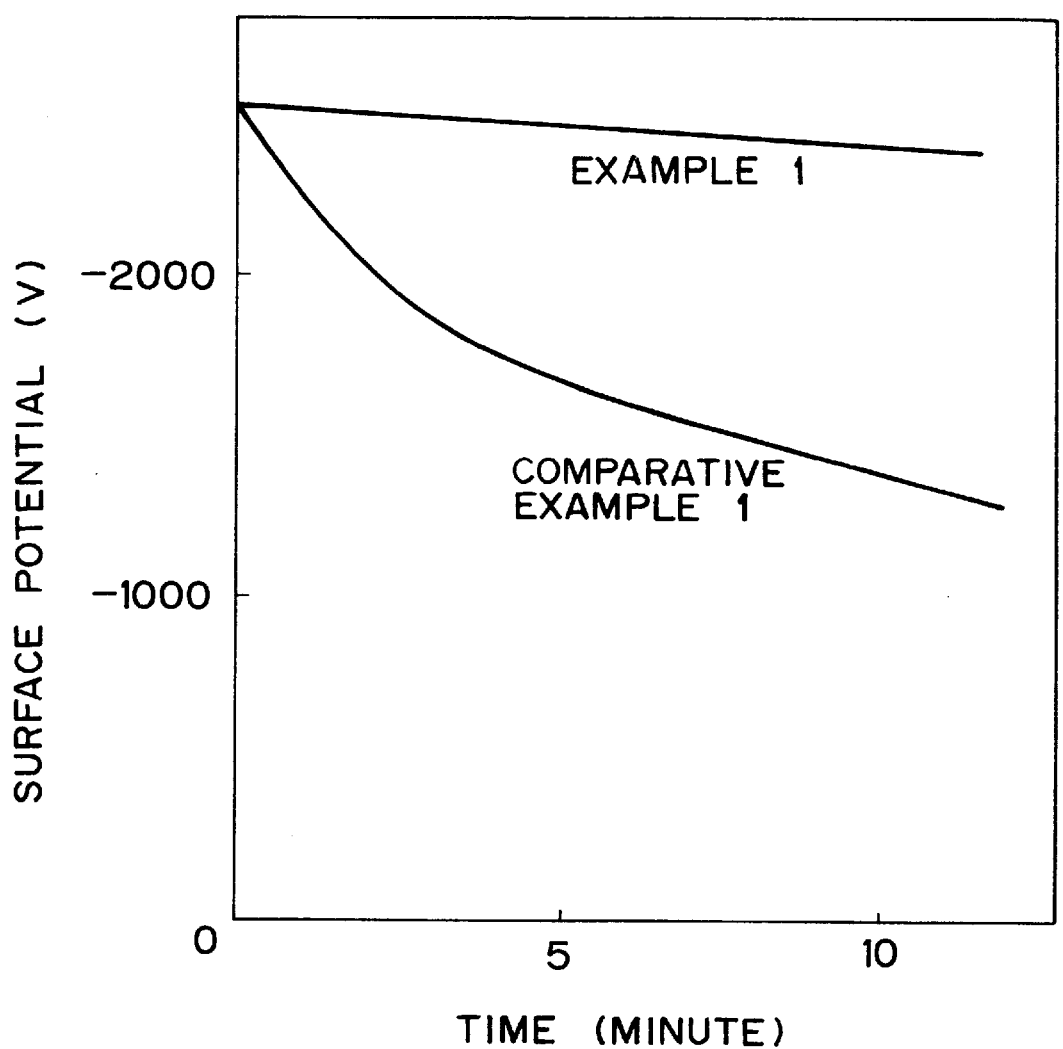
FIG. 2 is a diagram showing changes in the surface potential of silicone rubber surface with lapse of time.

Electrical insulation of the rubbery elastomers obtained in Example 1 and Comparative Example 1 was investigated in the following manner. Test pieces of the rubbery elastomers, 20 mm×60 mm×2 mm, were subjected to application of corona discharge at −5,000 V for a predetermined time (one second) and immediately thereafter changes in the potential on the surfaces of the test pieces of the rubbery elastomers were measured by an induction probe of a surface potentiometer. The results are shown in FIG. 2.

TEST EXAMPLE 2

The bleeding state of the silicone oil contained in the rubbery elastomers obtained in Example 1 and Comparative Example 2 was investigated in the following manner.

Test pieces of the rubbery elastomers in the form of true circular disk, 12.7 mm thick and 29.0 mm in diameter, were each pinched between a pair of 4 sheets of copy paper (NP paper, trade name of a product made by Canon) in a press device comprising a pair of flat press plates for pinching and fixing the test piece, bolts and spacers, and pressed to 25% compression and left at 100° C. as they were. Weight of the test piece was measured at predetermined time intervals. The results are shown in FIG. 3.

Figure 3:
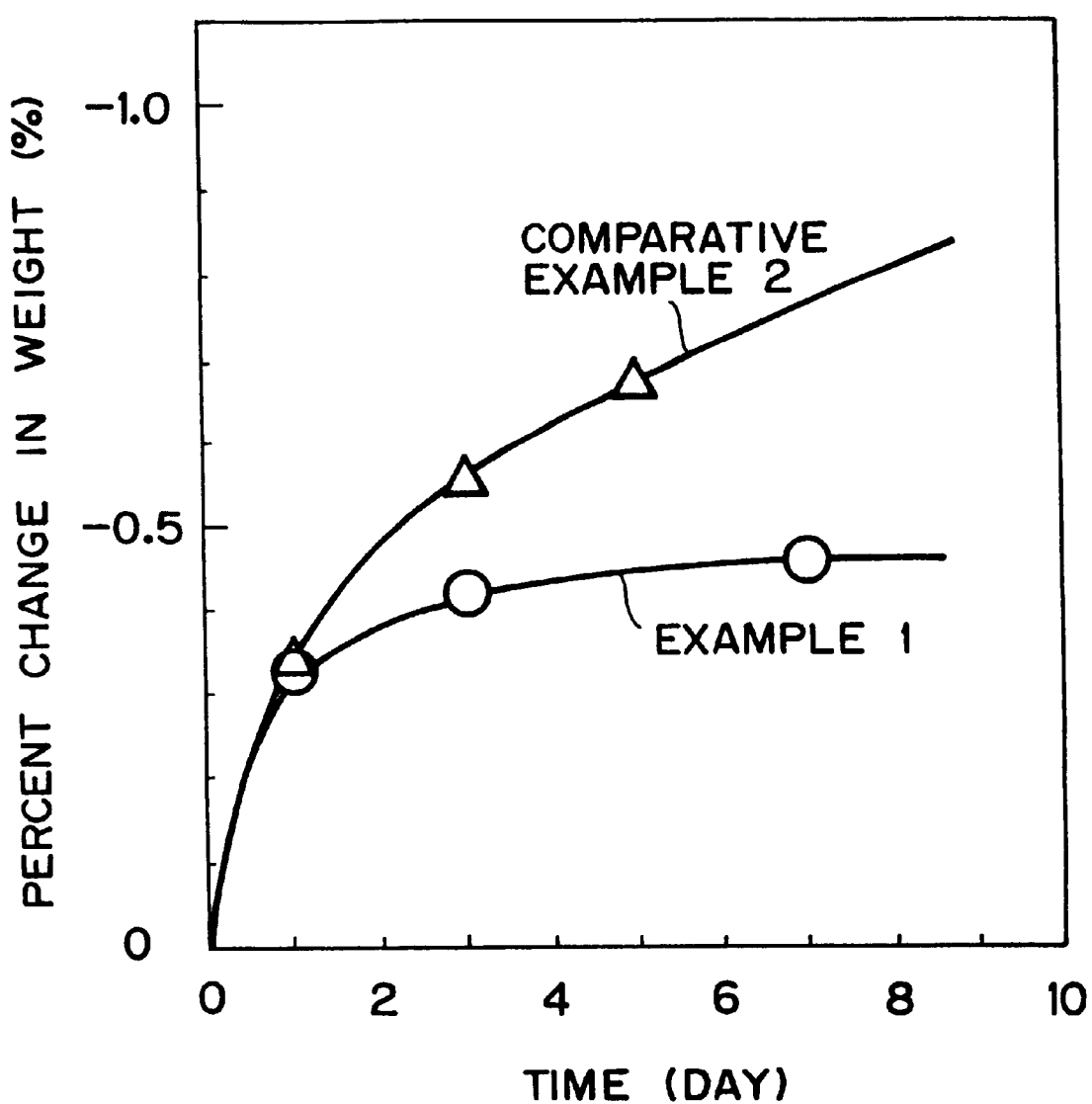
FIG. 3 is a diagram showing percent changes in the weight of a molding product of silicone rubber with lapse of time when the molding product sandwiched between copy sheets was compressed to 25% and left at 100° C.

As is apparent from FIG. 3, the present molding product was distinguished in the slow release of dimethylsilicone oil.

TEST EXAMPLE 3

Hardness and impact resilience of the rubbery elastomers obtained in Example 1 and Comparative Examples 1 and 2, are shown in the following Table.

TABLE

|  | Example 1 | Comp. Example 1 | Comp. Example 2 |
| --- | --- | --- | --- |
| Hardness (JISA) | 27 | 25 | 16 |
| Impact resilience (%) | 74 | 76 | 69 |

As is apparent from the foregoing Table, the rubbery elastomer of Example 1 had physical properties equivalent to those of Comparative Example 1 without the dimethylsilicone oil. The rubbery elastomer of Comparative Example 2 with the dimethylsilicone oil as directly admixed had poor hardness and impact resilience.

EXAMPLE 2

A press roller for a fixing device utilizing heating and pressing, which had an elastic layer of the present silicone rubber composition, was produced in the following manner:

Into a cylindrical mold provided with a press roller core cylinder of stainless steel, 10 mm in outer diameter, coated with a siloxane-based primer on the surface in advance, and preheated to 130° C., a uniform liquid mixture of liquid A and liquid B of the silicone rubber compositions of Example 1 in a weight ratio of 100:100 was injected after defoamation, and kept at 130° C. for 10 minutes to cure the mixture. After the curing, the silicone rubber-coated press roller was formed and taken out of the mold. Its outer diameter was 16 mm, and the thickness of the silicone rubber coating layer was 3 mm.

The thus obtained press roller was mounted on a fixing device of heat fixation type as shown in FIG. 1 and subjected to a fixation test with continuous copy sheet passage under the following conditions. The fixing roller 1 comprising an aluminum core cylinder, 20 mm in outer diameter, and a layer of tetrafluoroethylene resin having a thickness of 15 μm, laid on the outer surface of the core cylinder, was used in the fixing device.

Fixing conditions:

Controlled surface temperature of the fixing roller: 150° C.

Pressing force between the fixing roller and the press roller: 6 kgf

Test sheet: A4-size, transfer sheets (plain paper), provided each with an unfixed, positively charged toner image of a test pattern on the surface Sheet test speed: 4 sheets/min.

The results showed that no fouling due to attachment of toner was observed on the press roller surface and no attachment of toner to the fixing roller surface was observed at all even after passage of 10,000 sheets. Deterioration of image quality, image fouling and blank images were not observed at all. That is, good image quality and fixation were maintained throughout the test. Particularly coiling of sheets around the roller, sheet clogging, sheet curling, sheet wrinkling were not observed at all, and no jam troubles were observed. Thus, a good carryability was maintained throughout the test. Changes in the shape of the roller were very small and a good dimensional stability was maintained.

COMPARATIVE EXAMPLE 3

A press roller was produced in the same manner as in Example 1 except that the liquids C and D of Comparative Example 1 were used.

The results showed that fouling due to the attachment of toner was developed on the press roller surface after passage of 5,000 sheets, and deterioration of image quality, image fouling, blank image, sheet wrinkling, sheet clogging, sheet curling, etc. occured.

COMPARATIVE EXAMPLE 4

A press roller was produced in the same manner as in Example 2 except that liquids E and F of Comparative Example 2 were used.

The results showed that fouling due to the attachment of toner was developed on the press roller surface after passage of 6,000 sheets, and deterioration of image quality, image fouling, blank images, sheet wrinkling, sheet clogging, sheet curling, etc. occured.

According to the present invention, the electrical insulation of the rubber molding product can be improved by adding porous inorganic fine powders with micropores holding dimethylsilicone oil to a silicone rubber composition.

Furthermore, according to the present invention, bleeding of dimethylsilicone oil onto the surface of the rubber molding product can be suppressed or reduced by holding dimethylsilicone oil in micropores of the porous inorganic fine powders.

Still further, according to the present invention, deterioration of the physical properties such as hardness, impact resilience, etc. of the rubber molding product when dimethylsilicone oil is added to a silicone rubber composition, can be suppressed.

When the present silicone rubber composition is used as an elastic surface layer of a press roller in an image-fixing device in an image-forming apparatus such as an electrophotographic copying machine using a positively charged toner as a developing agent, the fixation efficiency of a positively charged toner image on a toner image-carrying material, such as plain paper, can be increased, because the roller surface is negatively charged, and as a result, the amount of toner attached to the fixing roller surface can be considerably reduced, and thus poor image such as offset or fouling of the roller surface due to the attachment of toner can be prevented, thereby solving such problems as encountered in carrying the sheet, for example, sheet coiling around the roller, sheet curling, etc.

What is claimed is:

1. A method for fixing toner images on a toner image-carrying material, comprising:

passing a toner image-carrying material having positively charged toner images through a fixing device, and fixing said positively charged toner images on a first side of said toner image-carrying material by heating while simultaneously pressing a reverse side of said toner image-carrying material by a pressure roller of said fixing device, wherein said pressure roller has an elastic layer formed from a silicone rubber composition comprising a silicone rubber and porous inorganic fine powder having an average particle size of 1 to 40 μm and an oil absorbability of 200 to 800 ml/100 g, said porous inorganic fine powder holding dimethylsilicone oil, said dimethylsilicone oil being represented by the following formula:

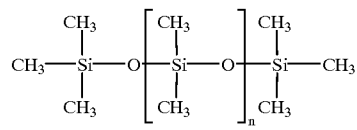

wherein n is a positive integer, and wherein 100 to 600 parts by weight of said dimethylsilicone oil is held in 100 parts by weight of said porous inorganic fine powder and said dimethylsilicone oil has a viscosity of 100 to 60,000 centistokes at 25° C., wherein said elastic layer maintains a minus potential and gradually releases said dimethylsilicone oil.

2. The method according to claim 1, wherein the dimethylsilicone without solvent is heated and then is held in heated inorganic fine powder.

3. The method according to claim 1, wherein 200 to 50 parts by weight of the dimethylsilicone oil is held in 100 parts by weight of the porous inorganic fine powder.

4. The method according to claim 1, wherein the porous inorganic fine powder holding said dimethylsilicone oil is contained in the silicone rubber at a concentration of 0.1 to 30% by weight on the basis of the silicone rubber.

5. The method according to claim 1, wherein the porous inorganic fine powder holding the dimethylsilicone oil are contained in the silicone rubber at a concentration of 1 20% by weight on the basis of the silicone rubber.

6. The method according to claim 1, wherein the silicone rubber comprises a silicone rubber of addition reaction polymerization.

7. The method according to claim 6, wherein the silicone rubber of addition reaction polymerization is producible by mixing a first liquid containing at least a liquid vinyl-containing diorganopolysiloxane and platinum catalyst as a curing reaction catalyst with a second liquid containing at least an active hydrogen radical-containing siloxane and a liquid vinyl-containing diorganopolysiloxane, and heating the mixture, thereby curing the mixture.

8. The method according to claim 6, wherein the silicone rubber of addition reaction polymerization is obtainable by a reaction between the first liquid with the second liquid in the presence of the porous inorganic fine powder holding the dimethylsilicone oil.

9. The method according to claim 8, wherein the porous inorganic fine powder has an oil absorbability of 300 to 600 ml/100 g.

10. The method according to claim 1, wherein the silicone rubber comprises a silicone rubber of condensation reaction polymerization.

11. The method according to claim 1, wherein the silicone rubber comprises a silicone rubber of radical reaction polymerization.

12. The method according to claim 1, wherein the silicone rubber comprises a solid silicone rubber.

* * * * *

UNITED STATES PATENT AND TRADEMARK OFFICE
CERTIFICATE OF CORRECTION

PATENT NO.   :  6,028,148
DATED        :  February 22, 2000
INVENTOR(S)  :  TOSHIYUKI MIYABAYASHI It is certified that error appears in the above-identified patent and that said Letters Patent is hereby corrected as shown below:

ON THE TITLE PAGE [56] References Cited:

FOREIGN PATENT DOCUMENTS, "60-16975" should read --60-166975--.

COLUMN 1:

Line 49, "dusts," should read --dust,--.

COLUMN 2:

Line 19, "Further" should read --A further--.

COLUMN 3:

Line 42, "--(-Si—CH=CH$_2$)--" should read --(Si—CH=CH$_2$)--; and

Line 54, "--(Si—H)--" should read --(—Si—H)--.

COLUMN 4:

Line 19, "lowing" should read --following--; and

Lines 21-25, "--(SiO)$_m$--" should read -- --(SiO)$_m$-- -- (with CH$_3$ above and H below Si).

UNITED STATES PATENT AND TRADEMARK OFFICE
CERTIFICATE OF CORRECTION

PATENT NO.   : 6,028,148
DATED        : February 22, 2000
INVENTOR(S)  : TOSHIYUKI MIYABAYASHI It is certified that error appears in the above-identified patent and that said Letters Patent is hereby corrected as shown below:

COLUMN 6:

Line 31, "stirring state" should read --stirring--; and
    Line 36, "100 parts" should read --¶100 parts--.

COLUMN 7:

Line 44, "Cs." should read --cs.--.

COLUMN 10:

Line 36, "are" should read --is--; and
    Line 37, "1 20%" should read --1-20%--.

Signed and Sealed this

Third Day of April, 2001

Attest:

NICHOLAS P. GODICI

*Attesting Officer*       *Acting Director of the United States Patent and Trademark Office*